No. 775,322. PATENTED NOV. 22, 1904.
G. A. WEBER.
INSULATED RAIL JOINT.
APPLICATION FILED JAN. 27, 1904.
NO MODEL. 10 SHEETS—SHEET 3.
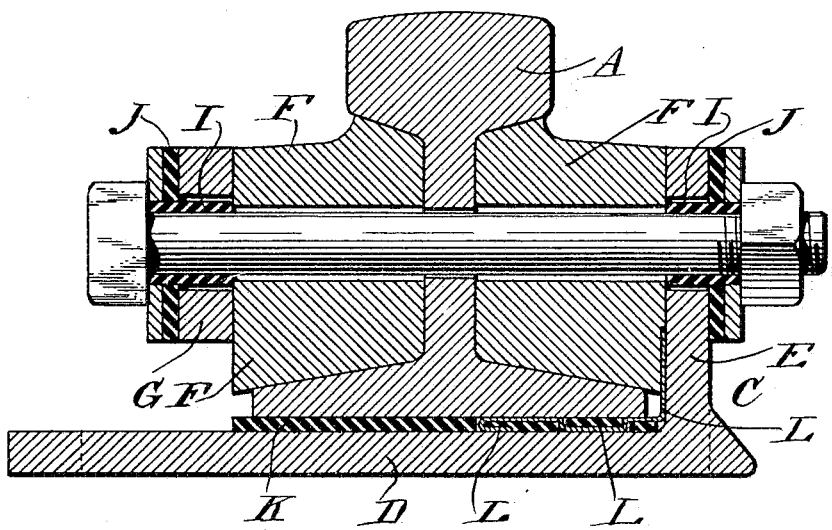
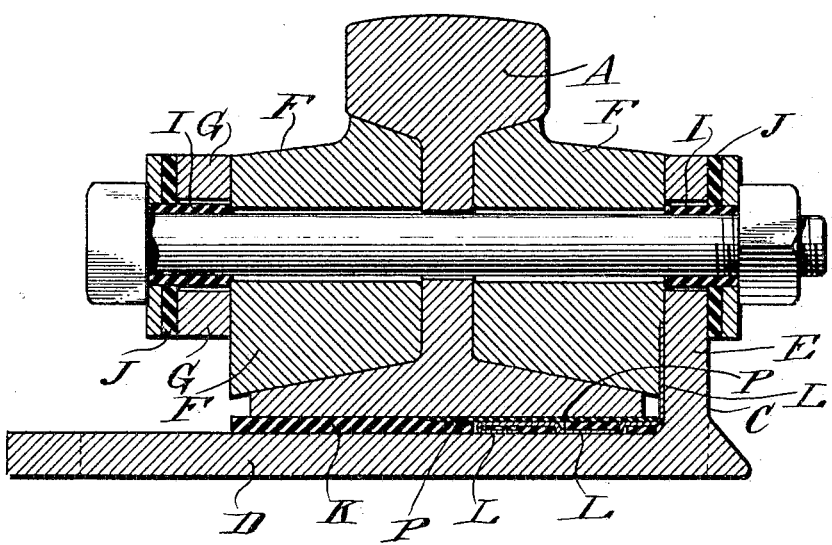

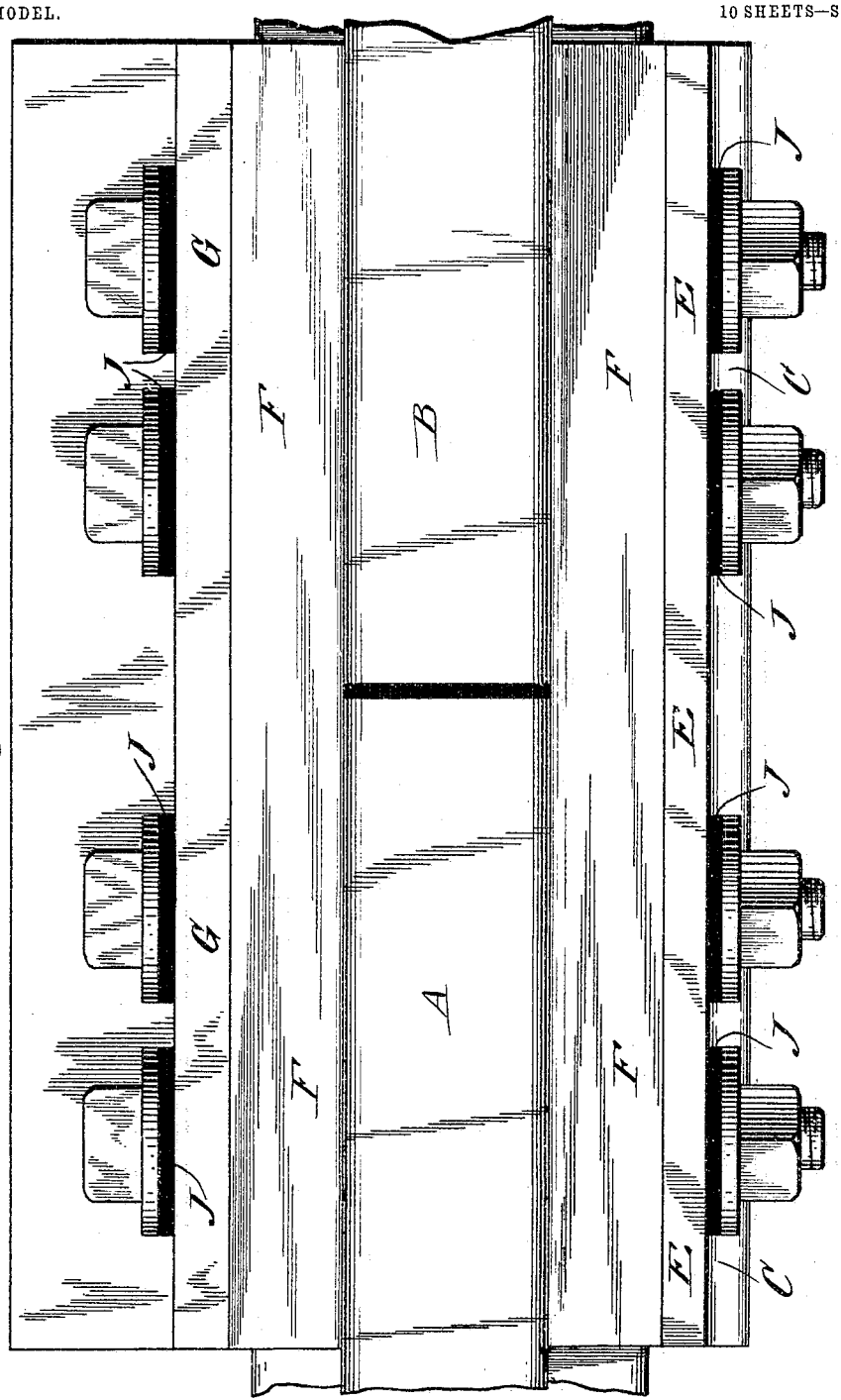

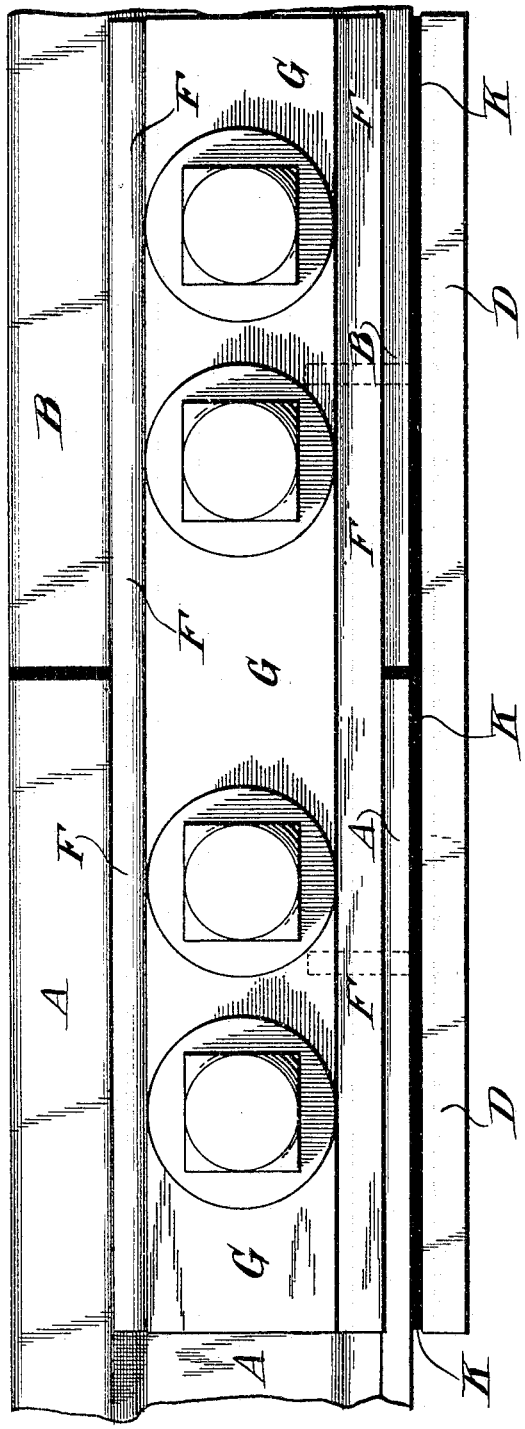

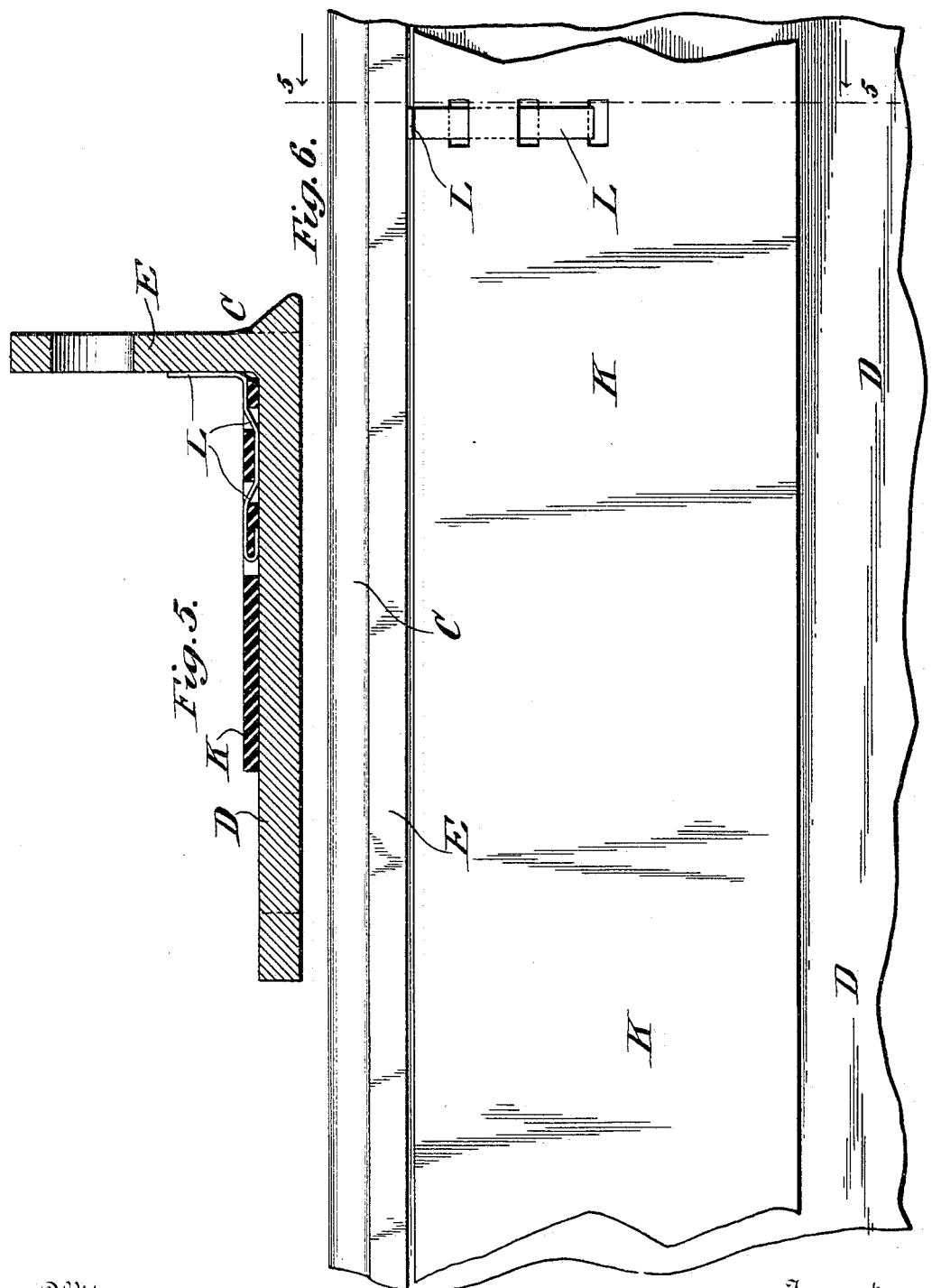

No. 775,322. PATENTED NOV. 22, 1904.
G. A. WEBER.
INSULATED RAIL JOINT.
APPLICATION FILED JAN. 27, 1904.
NO MODEL. 10 SHEETS—SHEET 5.
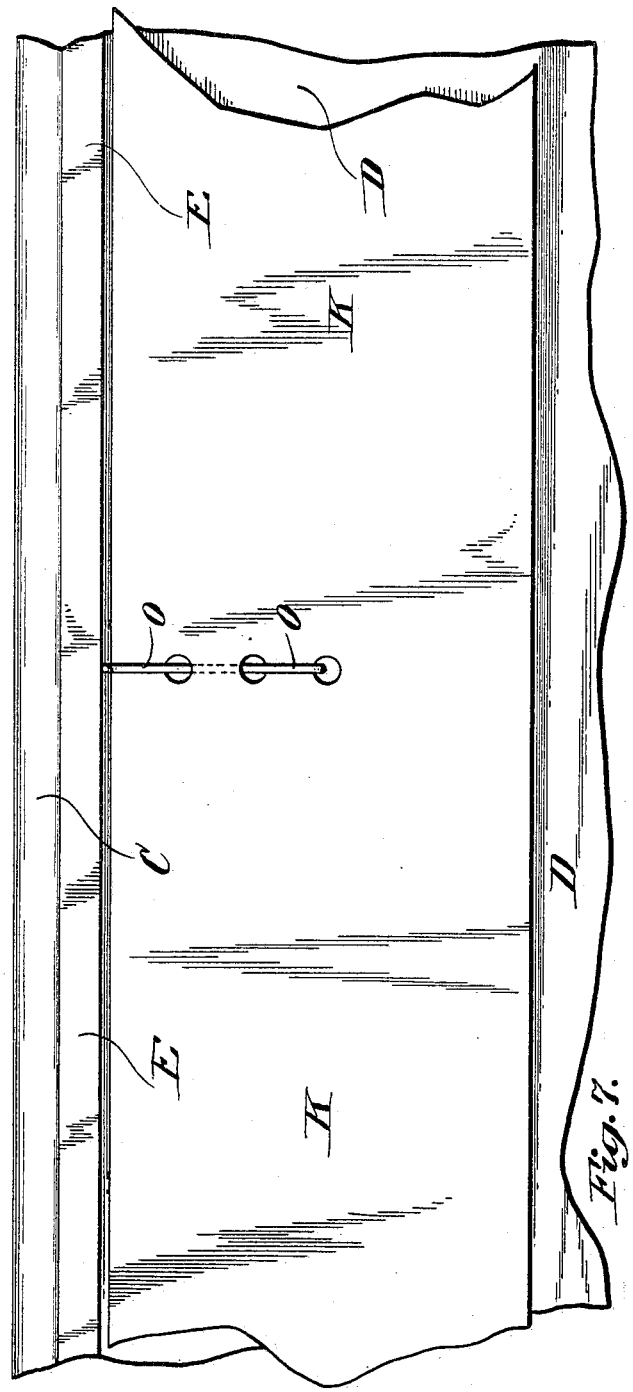
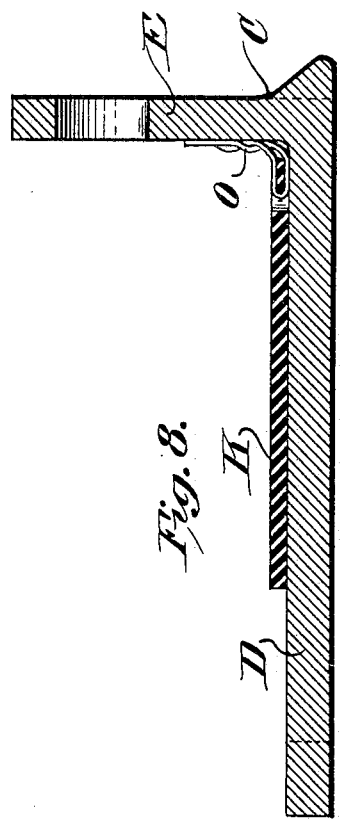

No. 775,322. PATENTED NOV. 22, 1904.
G. A. WEBER.
INSULATED RAIL JOINT.
APPLICATION FILED JAN. 27, 1904.
NO MODEL. 10 SHEETS—SHEET 6.
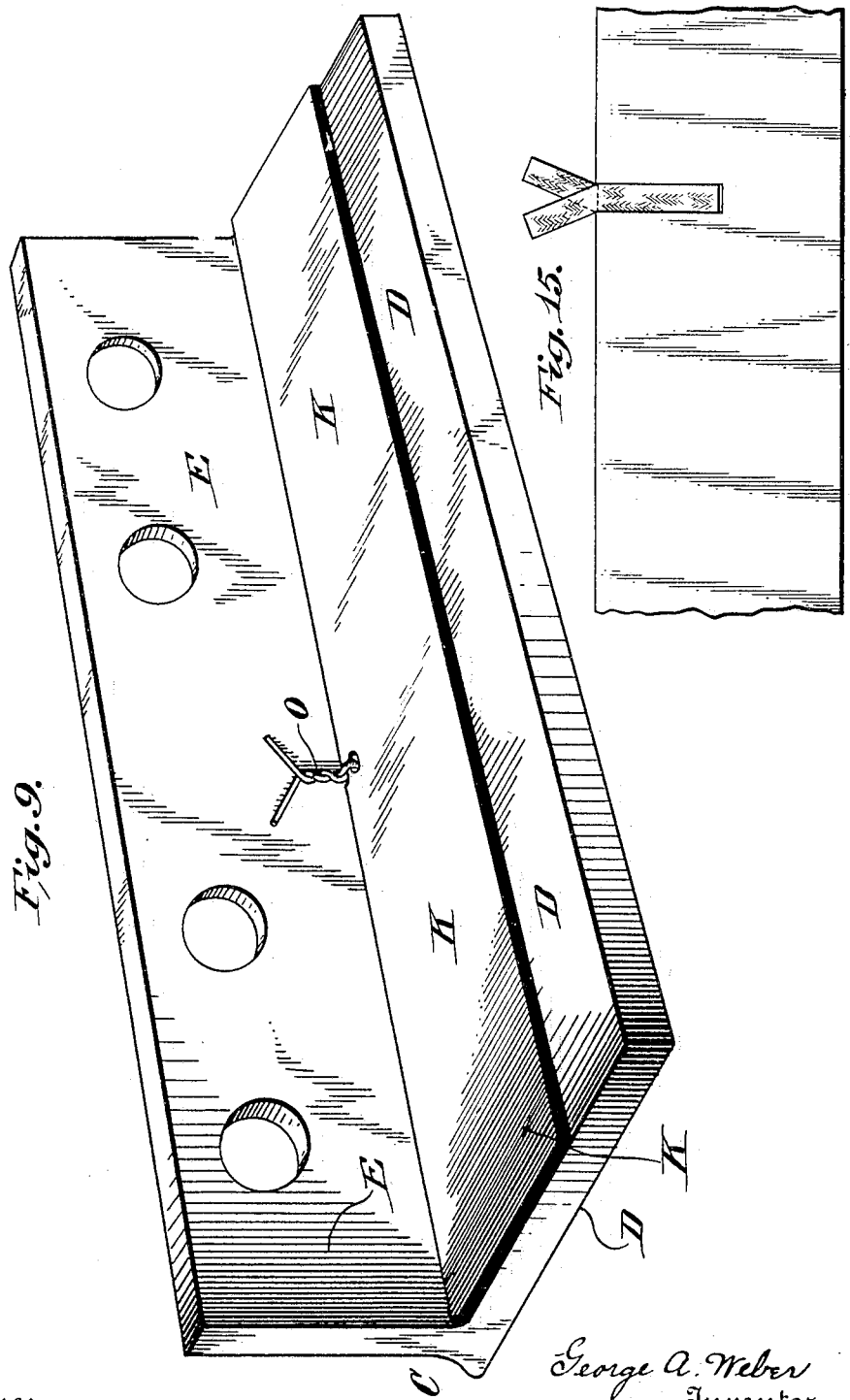

No. 775,322. PATENTED NOV. 22, 1904.
G. A. WEBER.
INSULATED RAIL JOINT.
APPLICATION FILED JAN. 27, 1904.
NO MODEL. 10 SHEETS—SHEET 7.
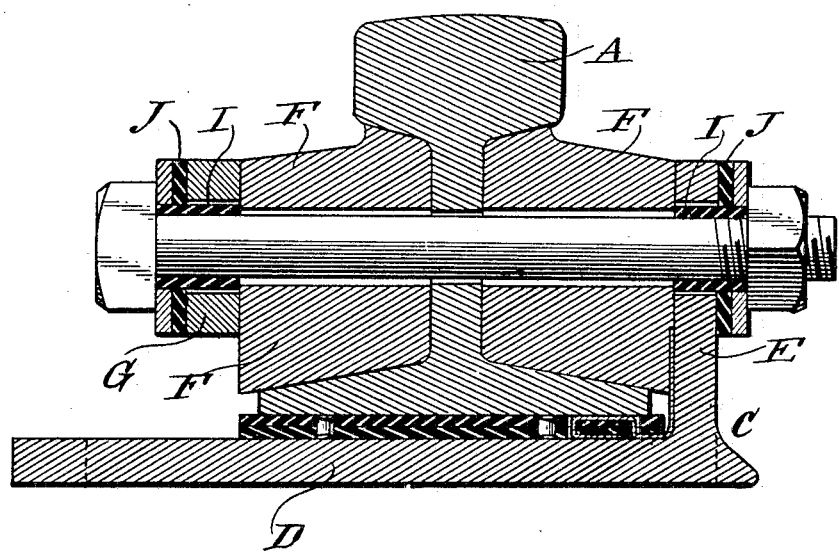
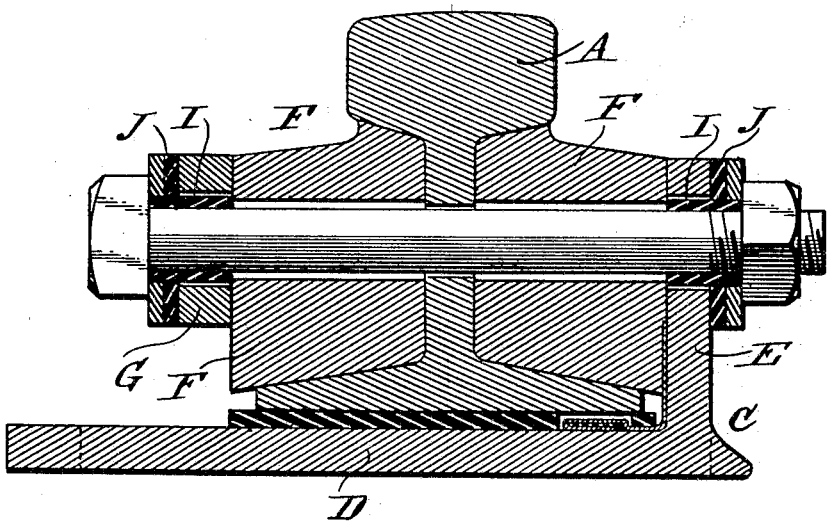

No. 775,322. PATENTED NOV. 22, 1904.
G. A. WEBER.
INSULATED RAIL JOINT.
APPLICATION FILED JAN. 27, 1904.
NO MODEL. 10 SHEETS—SHEET 8.
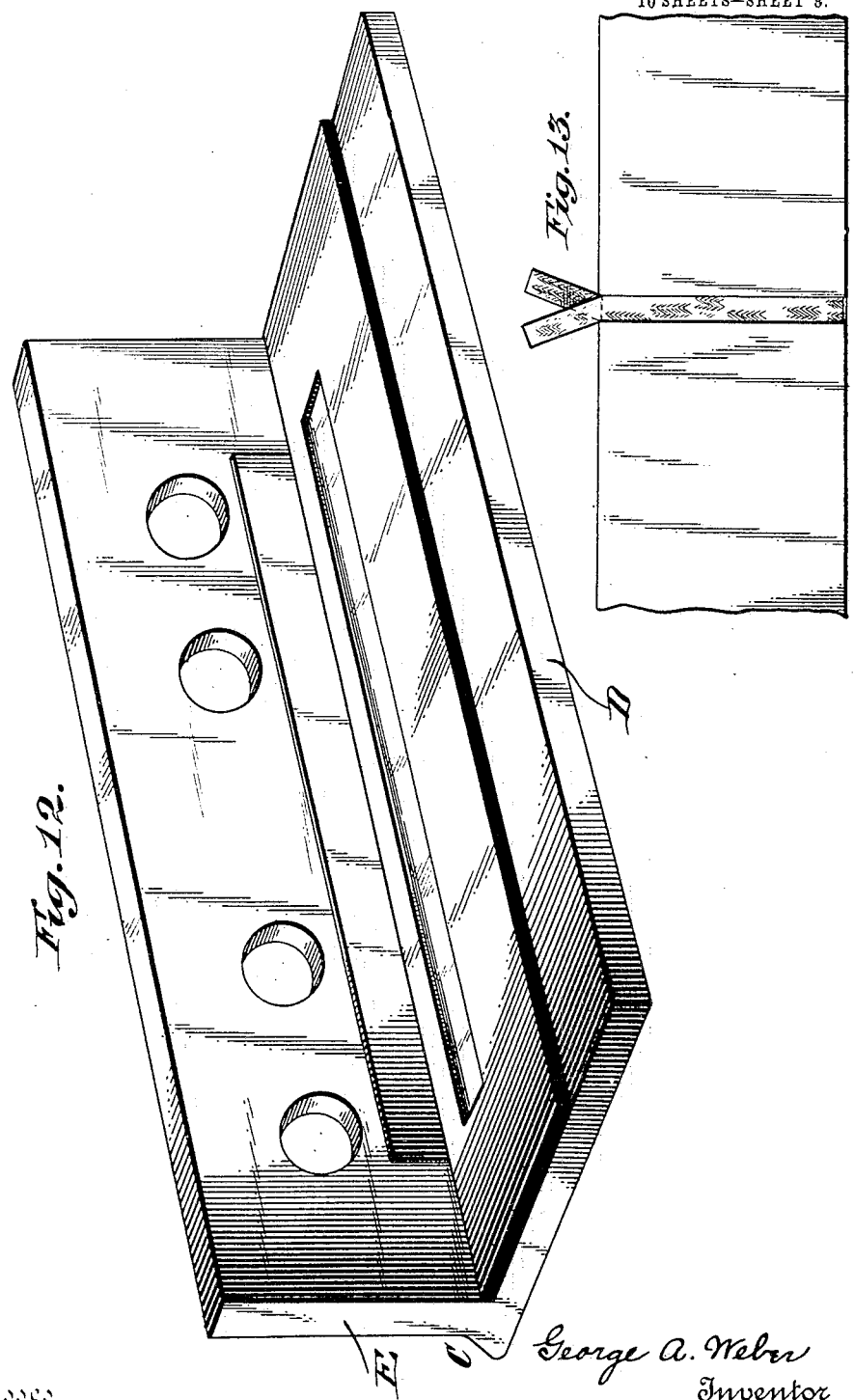

No. 775,322. PATENTED NOV. 22, 1904.
G. A. WEBER.
INSULATED RAIL JOINT.
APPLICATION FILED JAN. 27, 1904.
NO MODEL. 10 SHEETS—SHEET 9.

Witnesses
C. Mitchell
A. L. O'Brien

George A. Weber
Inventor
By Dickerson Brown
Raegener & Binney
Attys

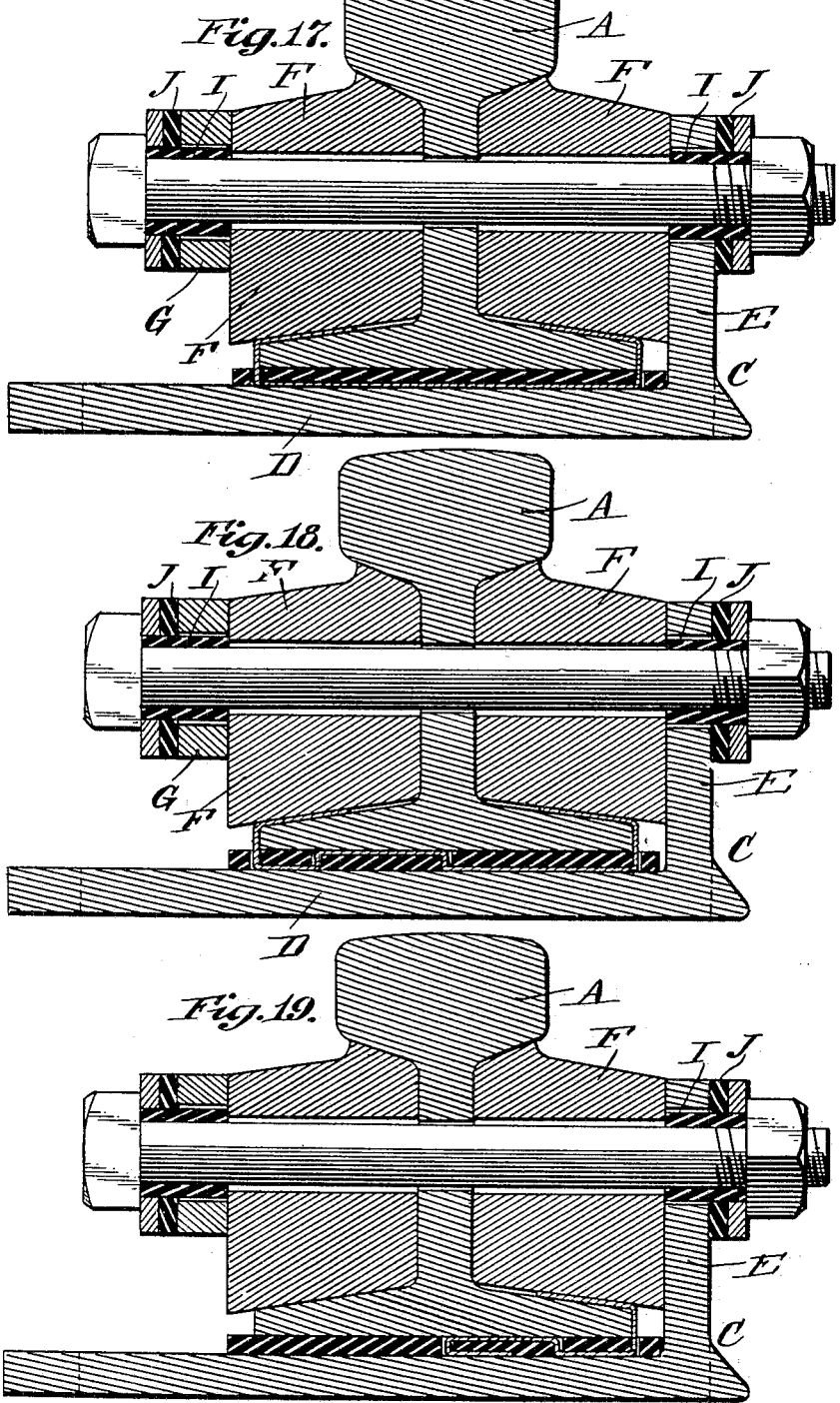

No. 775,322. Patented November 22, 1904.

UNITED STATES PATENT OFFICE.

GEORGE A. WEBER, OF NEW YORK, N. Y., ASSIGNOR TO WEBER RAILWAY JOINT MANUFACTURING COMPANY, OF NEW YORK, N. Y., A CORPORATION OF WEST VIRGINIA.

INSULATED RAIL-JOINT.

SPECIFICATION forming part of Letters Patent No. 775,322, dated November 22, 1904.

Application filed January 27, 1904. Serial No. 190,824. (No model.)

*To all whom it may concern:*

Be it known that I, GEORGE A. WEBER, a citizen of the United States, and a resident of the borough of Manhattan, city, county, and State of New York, have invented certain new and useful Improvements in Insulated Rail-Joints, of which the following is a specification accompanied by drawings.

This invention relates to insulated rail-joints; and its objects are to improve upon the construction of such joints and increase their efficiency and insulating qualities.

One of the difficulties experienced in the construction of insulated railroad-joints is found to exist in maintaining the insulation in position under one or both of the rails; and one of the objects of this invention is to secure efficient means for holding the insulation in position, which means are simple, strong, and cheap to manufacture.

Further objects of the invention will hereinafter appear; and to these ends the invention consists of an insulated joint for carrying out the above objects embodying the features of construction, combinations of elements, and arrangement of parts having the general mode of operation substantially as hereinafter fully described and claimed in this specification and shown in the accompanying drawings, in which—

Figure 14:
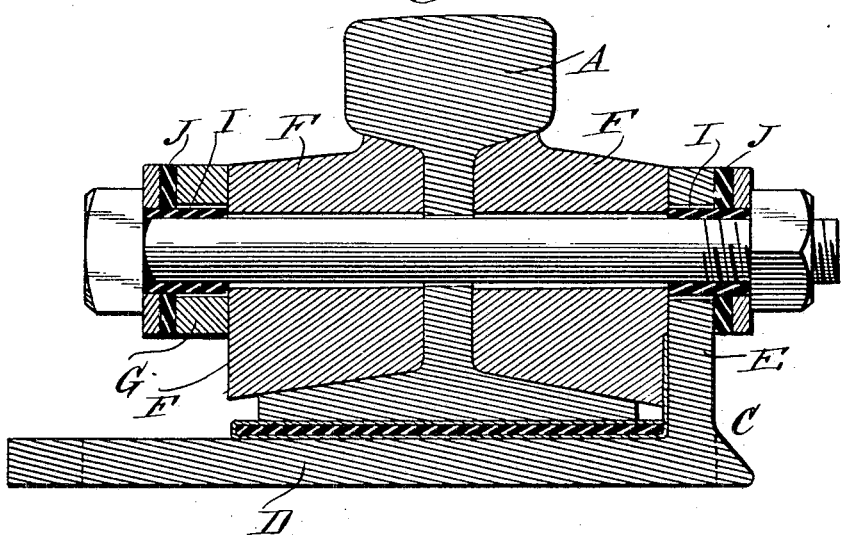
Figure 16:
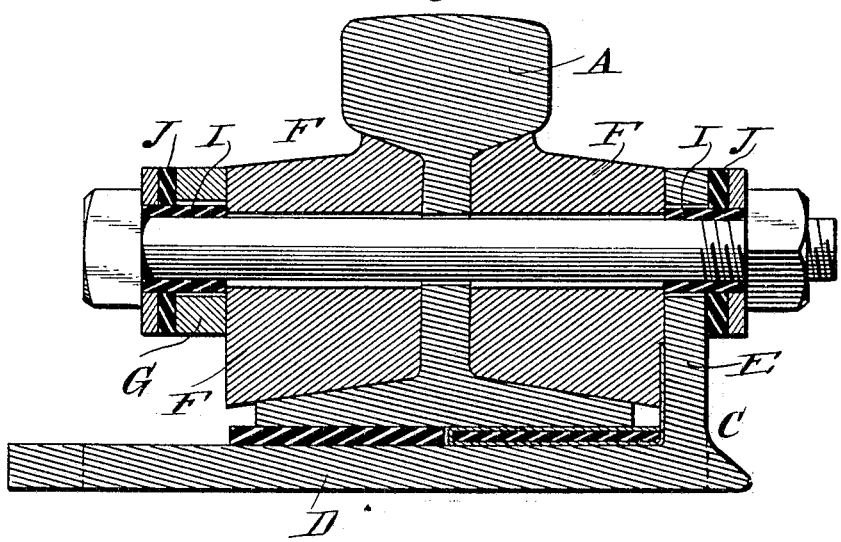

Figure 1 is a plan view, and Fig. 2 is a side view, of a joint embodying the invention. Fig. 3 is a transverse sectional view of the joint. Fig. 4 is a transverse sectional view of a modified form of joint. Fig. 5 is a detail sectional view showing another form of holding means for the insulation. Fig. 6 is a detail plan view of Fig. 5. Fig. 7 is a detail plan view showing the holding means at the center of the joint. Fig. 8 is a detail sectional view showing a modification. Fig. 9 is a detail plan view of Fig. 8. Fig. 10 shows a double layer of insulation held in position. Fig. 11 shows the holding device countersunk in the insulation. Fig. 12 shows the holding device in the form of a sheet extending along the chair. Fig. 13 is a detail plan view of a chair and a modified form of fastening. Fig. 14 is a transverse sectional elevation of a joint embodying the fastening shown in Fig. 13. Fig. 15 is a detail plan view of a chair and a modified form of fastening. Fig. 16 is a transverse sectional elevation of a joint embodying the fastening shown in Fig. 15. Figs. 17, 18, and 19 are transverse sectional elevations of joints embodying modified forms of fastenings.

Referring to the drawings, A and B represent the meeting ends of rails suitably supported in surface and alinement. In this instance the rails, as shown, are supported upon a chair C, having the base D and upright E, although other suitable forms of rail-supports may be provided. Extending along the webs of the rails are the insulating-blocks F, which may be of wood, while at the side of the joint opposite the upright E is a metallic band G, extending across the joint. Suitable bolts hold the parts of the joint together, insulated to break the electric continuity of the rails by the usual insulating-sleeves I and washers J. All of the bolts may be insulated as described or a sufficient number to break the electric continuity of the rails either at one or both sides of the meeting ends of the rails.

Insulation K is provided beneath the base of at least one of the rails or beneath the bases of both rails. If the insulation is provided beneath the base of one rail, suitable means must be provided beneath the other rail to compensate for the thickness of the insulation. In this instance the insulation K is shown in the form of sheets of suitable material, as fiber, and in order to maintain the insulation in position beneath the bases of one or both rails holding means are provided adapted to be suitably connected to the insulation and then extended upwardly and clamped between portions of the joint.

According to the invention and as shown in the drawings the holding means illustrated comprises a piece of metallic tape L or wire O, suitably connected to the insulation K and provided with an upwardly-extending end clamped between one of the filling-pieces F and the upright of the chair. If desired, the upwardly-extending end of the holding means L or O may be clamped between the filling-block F and the metallic strap G at the other side of the joint. In either case the insulation K is maintained in position beneath the rails and is prevented from slipping and creeping. The piece of metallic wire or tape is of such thickness that it does not interfere with the tightening of the parts of the joint, although if the holding means is made of extra thickness the filling-block F may be rabbeted to accommodate said thickness.

In Figs. 3 and 4 the metallic wire or tape is shown interlaced in holes in the insulation K, although other suitable means may be provided for connecting the holding means to the strip of insulation. In Fig. 5 the holding means is interlaced in holes in the insulation K, but in a slightly different manner, the holes being larger, which does not require such sharp corners at the bends of the tape or wire.

Where insulation is used beneath the base of but one rail, said insulation not extending across the joint, there may be as many holding-wires or tapes attached to said insulation as desired, and although said metallic wires or tapes may electrically connect one rail with the chair or with the metallic bar or band G at the same time no electrical connection will be formed between the meeting ends of the rails unless both rails should be electrically connected to the same bar or upright.

When a continuous strip of insulation is used beneath the bases of both rails, then the holding means should be preferably provided at one side of the break of the joint only. When said separate and independent holding wires or tapes are provided at both sides of the break of the joint, as indicated in Fig. 2 of the drawings in dotted lines, thus serving to connect both rails with the metallic parts of the joint, unless the rails are insulated from the metallic holding devices it is necessary to provide suitable insulation P, as shown in Fig. 4, for instance, between the rails and the metallic holding devices. The insulation P may consist of a thin strip or sheet of material placed over the metallic holding devices beneath the bases of the rails. The same purpose would be served if the insulation P were provided between the metallic holding devices and the upright of the chair. In those cases in which a plurality of holding devices are used, as indicated in Fig. 2, it will be seen that there is a holding device at each side of the center of the joint. By the center of the joint is meant the space between the meeting ends of the rails, which, as shown, is preferably filled by an insulating-piece of material called an "end post."

As shown in Fig. 6, the metallic tape L, forming a metallic holding device, is arranged at one end of a strip of insulation, which construction is found to maintain the insulation suitably in position. In Fig. 7 the holding device O is arranged substantially at the center of the strip of insulation near the position which the meeting ends of the rails would occupy. In this instance the insulation is supposed to extend beneath the bases of both rails, and the one holding means substantially at the middle portion of the insulation serves to hold the whole strip in position.

In Figs. 8 and 9 a modified form of holding device is shown, in this instance a piece of wire or tape O being looped through apertures in the insulation K and the ends then twisted together and separated to form a Y-shaped device, the Y-shaped ends being clamped between the parts of the joint.

A holding device described as being made of metal has been described in the specification by way of illustration; but the invention is not to be understood as limited to a metallic holding device, for the wire or tape may be formed of any suitable material—as, for instance, fiber or any material of sufficient strength and durability to carry out the objects of the invention and form a substitute for metal. The holding device, as shown, is formed separate from the insulation K and is suitably arranged to hold the insulation in position. The insulation and the holding device are independent one of the other, but are so arranged as to coöperate in carrying out the objects of the invention.

In Fig. 10 a plurality of layers of insulation riveted together by insulating-rivets are shown maintained in position by means of a holding device connected to both of them, although the holding device may obviously be connected to only one layer, if desired. In Fig. 11 the upper portion of the holding device is countersunk in the insulation to prevent contact with the rail.

In Fig. 12 the holding device is in the form of a sheet of material extending along the rail-chair. The material of the holding device may be plain heavy insulating fiber, and, as in Fig. 12, the holding-sheet may be of metal, in which case the upper portion of the sheet lying near the upper surface of the fiber should be countersunk, or else a piece of insulating-cloth or the like should be laid over the metal.

Figs. 13 and 14 show a piece of metal tape or insulating-tape, of fiber, linen, cotton, or other suitable material passed completely around the insulating-plate in a countersunk groove, the two ends of the tape then being clamped between parts of the joint. Figs. 15 and 16 show the tape extending only part way across the insulating-plate.

In Fig. 17 the tape is passed beneath the insulating-plate and the ends clamped between the rail and the insulating filling-blocks.

In Figs. 18 and 19 the tape is interlaced with the insulating-plate and the end or ends are clamped between the rail and the insulating block or blocks.

It will be seen that the holding device, whether in the form of a sheet of material or a tape, may in some instances, at least in part, embrace and surround the insulation and maintain it in position. In other instances, as in Figs. 13 and 17, it may entirely embrace the insulation.

Obviously some features of this invention may be used without others, and the invention may be embodied in widely-varying forms. Therefore, without limiting the invention to the constructions shown and described nor enumerating equivalents,

I claim, and desire to obtain by Letters Patent, the following:

1. An insulated rail-joint, comprising the meeting ends of rails, and means for maintaining said rails in surface and alinement, insulation beneath the base of at least one rail, and a holding device interlaced with the insulation and thence extended upwardly to be clamped between portions of the joint, for maintaining the insulation in position, for substantially the purposes set forth.

2. An insulated rail-joint, having insulation beneath the base of at least one rail, and a holding device in the form of a piece of tape of suitable material interlaced with the insulation and clamped between the portions of the joint, for maintaining the insulation in position, for substantially the purposes set forth.

3. An insulated rail-joint, having insulation beneath the base of at least one rail, and a holding device in the form of a piece of tape of suitable material interlaced with the insulation and suitably held in position in the joint for maintaining the insulation in position.

4. An insulated rail-joint, having a sheet of insulation beneath the base of at least one rail, and a holding device in the form of a piece of tape passing through at least one hole in the said sheet of insulation, and clamped between portions of the joint at one side of the center of the joint for maintaining the insulation in position.

5. An insulated rail-joint, having a sheet of insulation beneath the base of at least one rail, and a holding device passing through at least one hole in the said sheet of insulation, and clamped between portions of the joint at one side of the center of the joint for maintaining the insulation in position.

6. An insulated rail-joint, having a broad sheet of insulation beneath the base of at least one rail, and a holding device for maintaining the insulation in position consisting of at least one narrow piece of tape of suitable material connected to one portion of the said sheet of insulation, leaving the remaining portions free, said tape being suitably held in position in the joint at one side only of the center of the joint.

7. An insulated rail-joint having in combination a broad sheet of insulation beneath the bases of the rails, and holding devices separate and independent one from the other, for maintaining the insulation in position, said independent holding devices consisting of narrow pieces of thin flexible tape of suitable material connected to the sheet insulation at each side of the center of the joint and suitably held in position in the joint.

In testimony whereof I have signed this specification in the presence of two subscribing witnesses.

GEORGE A. WEBER.

Witnesses:
C. E. MALICK,
A. L. O'BRIEN.